No. 839,724. PATENTED DEC. 25, 1906.
W. BUTTLER.
METHOD OF POLISHING GLASS PLATES.
APPLICATION FILED JULY 17, 1906.

2 SHEETS—SHEET 1.

WITNESSES
Warren W. Swartz
R. A. Balderson.

INVENTOR
William Buttler
by Bakewell & Byrnes
his attys

No. 839,724. PATENTED DEC. 25, 1906.
W. BUTTLER.
METHOD OF POLISHING GLASS PLATES.
APPLICATION FILED JULY 17, 1906.

2 SHEETS—SHEET 2

WITNESSES
INVENTOR

UNITED STATES PATENT OFFICE.

WILLIAM BUTTLER, OF INDIANAPOLIS, INDIANA.

METHOD OF POLISHING GLASS PLATES.

No. 839,724.  Specification of Letters Patent.  Patented Dec. 25, 1906.

Application filed July 17, 1906. Serial No. 326,605.

*To all whom it may concern:*

Be it known that I, WILLIAM BUTTLER, of Indianapolis, Marion county, Indiana, have invented a new and useful Method of Polishing Glass Plates, of which the following is a full, clear, and exact description, reference being had to the accompanying drawings, forming part of this specification, in which—

Figure 1:
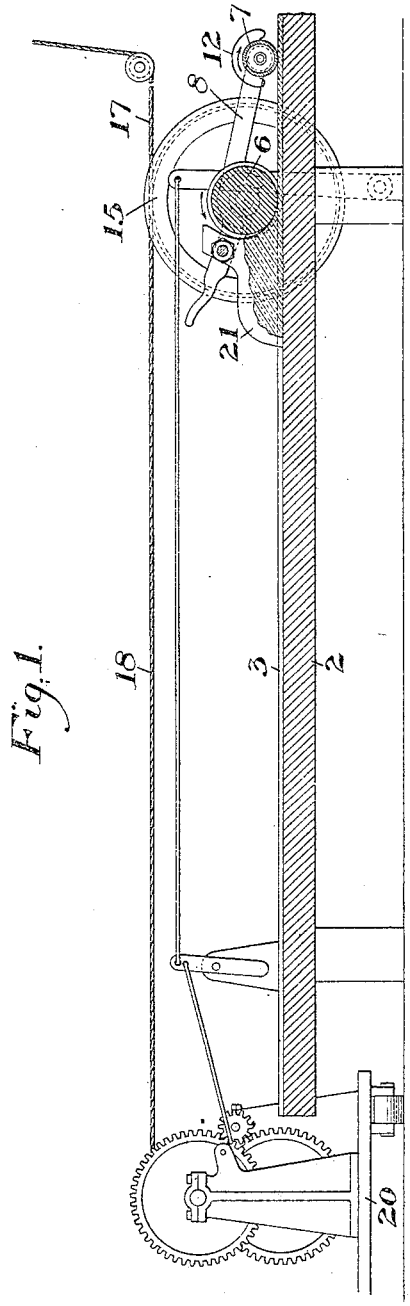
Figure 2:
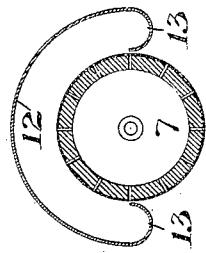
Figure 3:
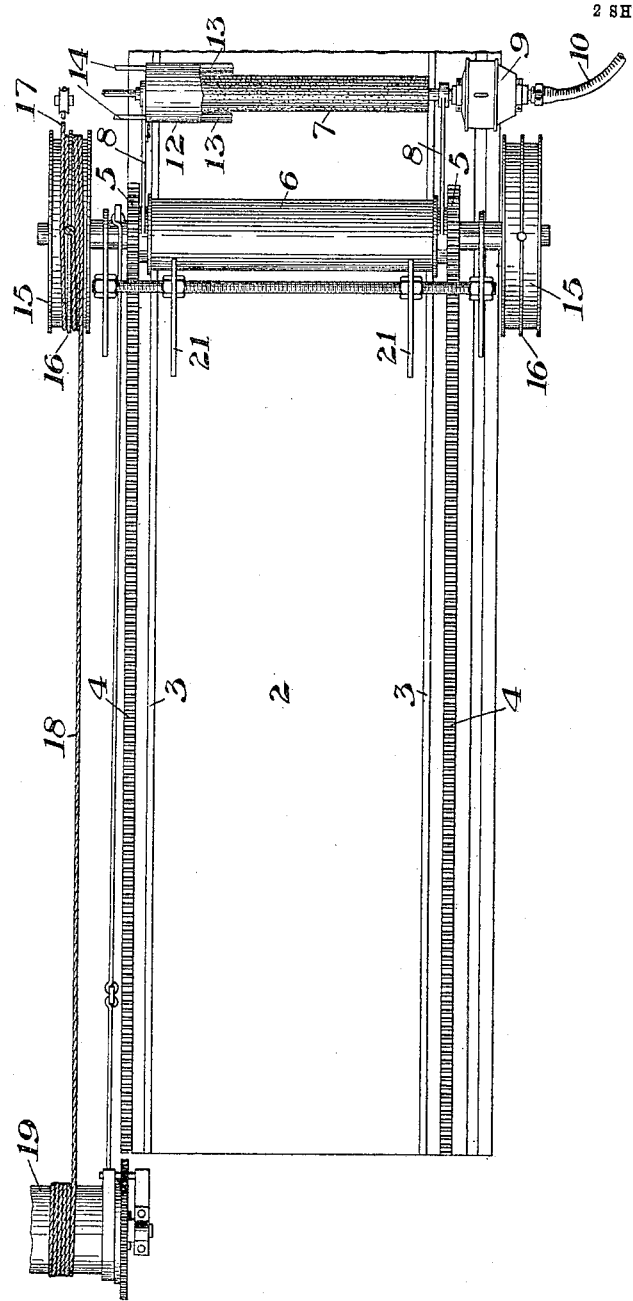

Figure 1 is a sectional side elevation showing one form of my apparatus. Fig. 2 is an enlarged detail section of the polishing-roller, and Fig. 3 is a partial top plan view of the apparatus.

My invention relates to the manufacture of sheet or plate glass, which is formed by rolling operations; and the object of the invention is to cheapen and improve the method of polishing such glass.

Heretofore in the manufacture of plate-glass the glass is rolled out to a thickness considerably greater than that of the finished article, and the plates thus rolled are removed and subjected to grinding operations on both sides and then to polishing operations on both sides. These operations are slow and expensive and greatly increase the cost of plate-glass.

My invention is designed to provide a simple method of polishing glass, preferably utilizing the heat of the glass as it is rolled.

The invention consists in subjecting the glass-surface to the action of a roller revolving at a high rate of speed and having a polishing-surface which acts upon the glass after the operation of the spreading-roller.

In the drawings, in which I show one form of apparatus for carrying out my improved method, 2 represents a rolling-table which may be of any desirable character. I have shown the table as having side ribs or guides 3 3 and outer racks 4, on which travel the pinions 5 of the spreading-roller 6.

Behind the spreading-roller 6 follows the polishing-roller 7. I have shown this polishing-roller as mounted on pivoted links 8, hinged to the shaft of the spreading-roller and resting by gravity upon the glass plate. This polishing-roller 7 is preferably rotated in the opposite direction to that of the roller 6, as shown by the arrows in Fig. 1, and at a high rate of speed. It may, however, be rotated in the same direction as the roller 6 at a high speed. I have found that a roller of six inches in circumference, driven at the rate of fifteen hundred or two thousand revolutions per minute, will give good results. For rotating the polishing-roller I may employ an electric motor, as shown at 9, which moves along with the polishing-roller and drives it. The polishing-roller is preferably made of a steel casting having a polished surface with a coating of suitable material evenly applied thereto. For this coating I have used sawdust cemented to the surface, with good results. The cement is preferably waterproof, and I preferably supply water to the roller during its polishing operation. For this purpose I have shown the flexible hose 10, leading to a hollow shaft or trunnion of the roller, such roller having radial perforation 11, through which the water may pass to its outer surface.

In order to prevent the water being drawn too far forward upon the mass of glass, I preferably employ the top shield 12, having bent trough portions 13, which catch the dripping water and conduct it to drip-pipes 14, which carry it away from the table.

Any suitable mechanism may be employed for moving the roller along the glass. For this purpose I have shown the projecting ends of the shafts of roller 6 as provided with pulleys 15 at one or both ends. Each pulley 15 is preferably divided into two parts by an intermediate rib or web 16, one part of the periphery receiving a rope or cable 17, fastened to the drum or pulley, while the other end extends to a counterweight system. (Not shown.) This counterweight system normally holds the roller at one end of the table, as shown. The other part of the pulley receives a rope or cable 18, one end of which is secured thereto, while the other extends to a winding-drum 19, which is positively actuated. The two cables are arranged on the drum so that one is wound up as the other is unwound. The drum 19 is preferably mounted on a truck or movable platform 20, which may carry a motor and controller or switch mechanism for driving the drum. The spreading-roller is moved along the table in one direction by the motor and in the opposite direction by the counterweight system. 21 represents the plows or shoes acting in conjunction with the roller.

In carrying out my improved method a mass of glass is deposited on the table in front of the forming-roller. The spreading-roller is then moved along to spread and roll the glass into plate form, it turning in the direction of the arrow or counter-clockwise, as shown in Fig. 1. At the same time the polishing-roller is drawn along over the glass sheet as it is being formed and is positively rotated at a high speed in the opposite direction to that of the forming-roller. The sawdust surface of this roller becomes glazed and acts to impart a high polish to the glass-surface over which it is moved. At the same time the application of water maintains the proper temperature and prevents too high temperature being reached.

The advantages of my invention result from the cheapness and simplicity of the operations by which glass having a polished surface may be obtained. The operation may be carried out simultaneously with that of rolling the plate and at small cost.

The polishing-roller may be made of different materials and provided with coverings of any desirable material. The system of applying water may or may not be used and other cooling systems may be adopted. The means for driving the polishing-roller at high speed in opposition to this movement along the glass may be varied, or it may be rotated in the opposite direction, though I prefer that shown. Many other changes may be made in the form and arrangement of the apparatus without departing from my invention.

I claim—

1. The method of polishing plate-glass, consisting in moving a roller along the glass and driving it at a high rate of speed, while the plate is still hot from the rolling operation; substantially as described.

2. The method of polishing plate-glass, consisting in moving a roller thereover, and driving it in the opposite direction to that of its movement, and at a high rate of speed; substantially as described.

3. The method of polishing plate-glass, consisting in moving a roller over the glass, positively driving said roller at high speed and applying cooling means thereto; substantially as described.

4. The method of making plate-glass, consisting in rolling the glass into plate form, simultaneously moving a polishing-roller thereover and positively rotating said roller at high speed; substantially as described.

5. The method of polishing glass, consisting in passing a roller over its surface, rotating said roller at high speed, and feeding water through such roller to its surface during the polishing step; substantially as described.

In testimony whereof I have hereunto set my hand.

WILLIAM BUTTLER.

Witnesses:
J. M. MARKLEY,
B. F. WATSON.